United States Patent
Israelson

(10) Patent No.: US 6,946,209 B1
(45) Date of Patent: Sep. 20, 2005

(54) DESULFURIZATION FOR FUEL CELL SYSTEMS USING SULFUR SEPARATING MEMBRANES

(75) Inventor: Gordon Israelson, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 907 days.

(21) Appl. No.: 09/669,784

(22) Filed: Sep. 25, 2000

(51) Int. Cl.$^7$ ............................................. H01M 8/04
(52) U.S. Cl. ............................ 429/17; 429/12; 429/13
(58) Field of Search ........................... 429/12, 13, 17

(56) References Cited

U.S. PATENT DOCUMENTS

| | | |
|---|---|---|
| 3,534,528 A | 10/1970 | J.H. Porter |
| 3,653,180 A | 4/1972 | Juliano et al. |
| 4,130,403 A | 12/1978 | Cooley et al. |
| 4,202,865 A * | 5/1980 | Preston, Jr. ............ 208/216 R |
| 4,608,060 A | 8/1986 | Kulprathipanja et al. |
| 4,702,971 A | 10/1987 | Isenberg |
| 4,812,329 A | 3/1989 | Isenberg |
| 4,978,439 A * | 12/1990 | Carnell et al. ............ 208/211 |
| 5,021,304 A | 6/1991 | Ruka et al. |
| 5,407,466 A | 4/1995 | Lokhandwala et al. |
| 5,413,879 A | 5/1995 | Domeracki et al. |
| 5,487,774 A | 1/1996 | Peterson et al. |
| 5,527,631 A | 6/1996 | Singh et al. |
| 5,686,196 A | 11/1997 | Singh et al. |
| 5,769,909 A | 6/1998 | Bonk et al. |

FOREIGN PATENT DOCUMENTS

| | | |
|---|---|---|
| EP | 0435724 | 7/1991 |
| EP | 0481813 | 4/1992 |
| GB | 2281077 | 2/1995 |
| GB | 2289286 | * 11/1995 |

* cited by examiner

Primary Examiner—Dah-Wei D. Yuan

(57) ABSTRACT

A process to desulfurize a fuel gas, such as natural gas, for use as a feed fuel for a fuel cell is characterized by providing a feed stream (10) of sulfur containing gas, passing part of that as a stream (12) to a compressor (14), passing the compressed stream to a sulfur selective membrane (16) to provide a sulfur rich stream (18) which is returned to the feed stream (10), and a sulfur lean stream (20) which can be passed to an optional gas meter (26) and then to a sulfur sorbent medium (28) before reforming the essentially sulfur free stream (34) in the reformer (40) of a fuel cell unit (36) also containing a fuel cell (38).

20 Claims, 1 Drawing Sheet

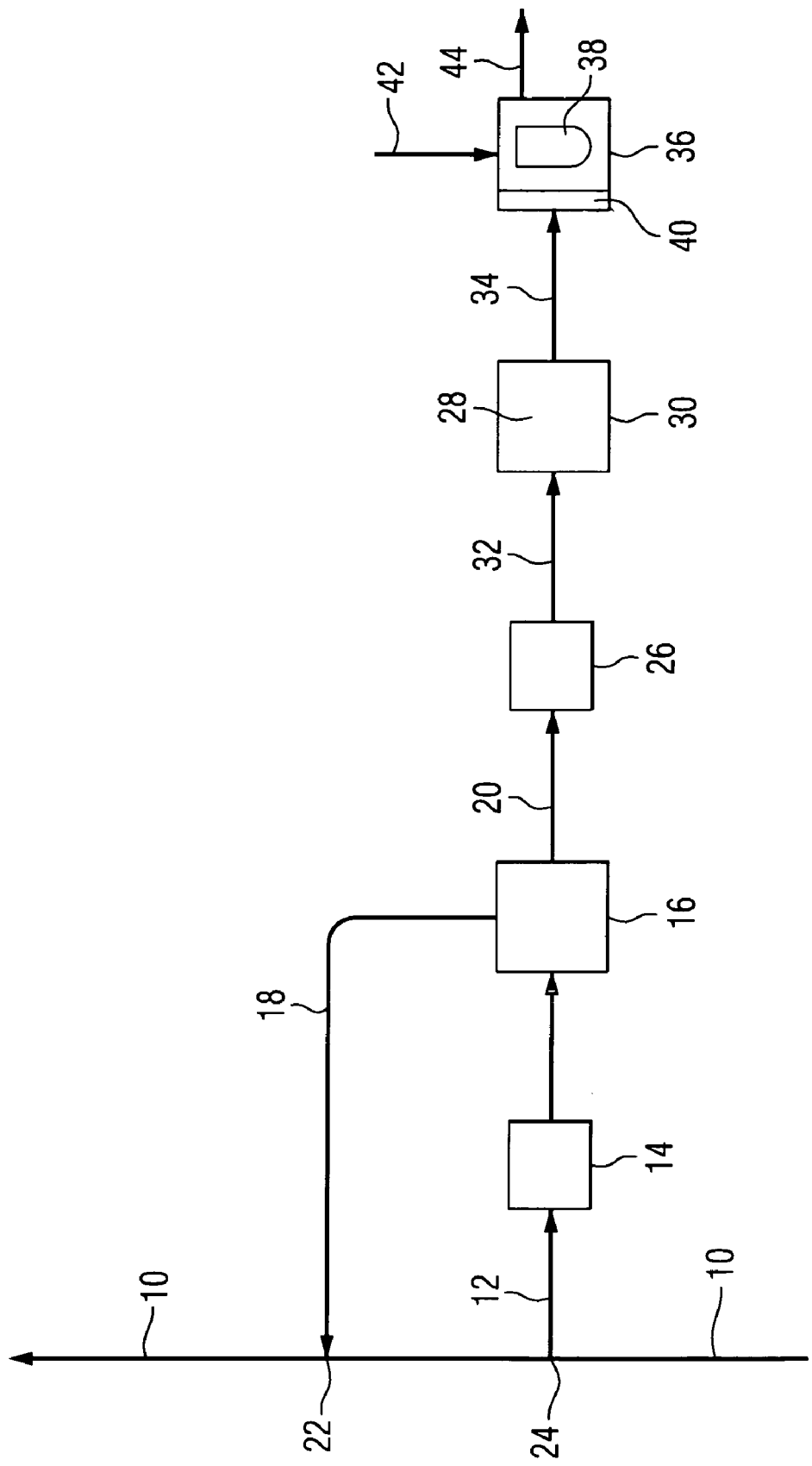

DESULFURIZATION FOR FUEL CELL SYSTEMS USING SULFUR SEPARATING MEMBRANES

BACKGROUND OF THE INVENTION

1. Field of the Invention

The invention relates generally to fuel cell power generation systems operating on natural gas as a fuel, and a method to reduce sulfur content of the natural gas as it enters the fuel cell.

2. Background Information

Fuel cell systems incorporating means to reduce sulfur content of feed fuel are well known and taught for example in U.S. Pat. No. 5,413,879 (Domeracki, et al.). There, natural gas or coal derived fuel gas was pumped through a fuel pre-heater and then directed, at 400° C., to a desulfurizer containing a bed of sulfur sorbent, to reduce sulfur context to less than 0.1 ppm (parts/million), after which it was then passed to a solid oxide fuel cell generator ("SOFC").

The use of untreated natural fuel gas, diesel fuel, sulfur containing coal derived fuel gas, or other sulfur containing fuel gas, all herein defined as "sulfur containing fuel gas", for fuel cell feed, has provided many problems including carbon deposition on many fuel cell generator components and sulfur degradation of the fuel electrode. While natural gas can contain low sulfur content, in most cases highly odorous sulfur compounds such as mercaptans are added to permit detection of gas leaks.

Reforming the fuel gas, defined as breaking down larger carbon molecules to smaller components such as $C_1$–$C_2$ hydrocarbons, predominantly methane, $H_2$ and CO has been performed, usually with a steam component, internally and/or externally by endothermic reaction in catalyst beds of magnesium oxide, nickel, or platinum supported on sintered aluminum, as taught in U.S. Pat. No. 5,527,631 (Singh, et al.). Sulfur treatment of sulfur containing fuel gas was specifically dealt with by Singh, et al., in U.S. Pat. No. 5,686,196. There, diesel fuel, having a sulfur content of about 0.5 wt. %, was mixed with hydrogen at low pressure, pressurized, evaporated, and then the mixture passed to a hydrodesulfurizer consisting of a Co—Mo catalyst and a ZnO reactive metal bed, where organic S was converted to $H_2S$ and then reacted to form ZnS, to reduce sulfur content to levels of about 1.0 ppm–0.2 ppm. The desulfurized fuel was then passed to a reformer, a condenser, and then to a hydrogen separator made of metallic or polymeric material, preferably Pd—Ag on a nickel support, or a semi-permeable polysulphone hollow fiber membrane. These materials pass the hydrogen through and then back to the diesel fuel/hydrogen mixer, and pass the rejected, reformed fuel to an SOFC. This process was quite complicated and required costly regeneration or disposal of the catlyzed-reactive hydrodesulfurization bed.

Other attempts to solve sulfur poisoning of SOFC fuel electrodes were made by Isenberg in U.S. Pat. Nos. 4,702,971 and 4,812,329. There, the fuel electrode itself, a nickel particle-cermet structure on the exterior of the SOFC was coated with separate porous, gas permeable oxygen-ionic-electronic conductor material, such as doped ceria or doped urania which reduces absorption of sulfur species on the electrode active sites. This process required depositing a delicate 0.5 micrometer to 20 micrometer film and added an extra process step and an additional expense to SOFC costs. Ruka, et al., in U.S. Pat. No. 5,021,304 improved the Isenberg coating process, using a separate layer of very small nickel particles as a surface for the doped cerea or doped urania, which made the process even more complicated. What is needed is a process to eliminate the need to apply additional fuel cell layers to the external electrode. Also, replenishing sulfur sorbent, from 6 to 12 times a year, can be very expensive in a commercial process, so there is a need for improved sorbents or other means to reduce these costs.

SUMMARY OF THE INVENTION

Therefore, it is a main object of this invention to reduce costs in the step of desulfurization and replacement or regeneration of sulfur sorbent catalyst beds. It is another main object to reduce or eliminate the necessity of using sulfur tolerant layers on exterior fuel electrodes of SFOC's.

These and other objects of the invention are accomplished by a process to desulfurize sulfur containing fuel gas used as feed fuel for a fuel cell system, comprising the steps: (1) providing a main feed stream of sulfur containing fuel gas containing at least 0.30 ppm of odorous sulfur compounds; and then (2) passing part of that main feed stream of sulfur containing fuel gas and compressing it to a pressure over 304 kPa (44 psia or 3 atmospheres); and then (3) passing the compressed sulfur containing fuel gas to a sulfur selective membrane, where the gas is separated into a sulfur concentrated stream, and a sulfur lean stream containing no more than 0.20 ppm of sulfur compounds; and then (4) passing the sulfur concentrated stream back to the main feed stream down stream from where the stream of step (2) was provided and then (5) optionally measuring gas flow and reducing gas pressure, and then (6) passing the sulfur lean stream through a sulfur sorbent medium to collect sulfur, providing an essentially sulfur free stream containing no more than 0.10 ppm of sulfur compounds; and (7) optionally reforming the essentially sulfur free stream prior to passing it to contact a fuel cell. The term "ppm" means ppm by volume throughout. Preferably the main feed stream of sulfur containing fuel gas is a natural gas stream, which may contain as high as 10 ppm of mercaptan, sulfide, thiophene, or other type sulfur compounds, usually added to permit detection in the event of a gas leak. The sulfur selective membrane can either pass or reject sulfur compounds and can be made from, for example, fluorinated block copolymers, silica membranes or aromatic polyamides. The steps (1) through (6) follow each other. There may be other steps between steps (6) and (7), for example pressure reduction can occur here if necessary. Finally, reformed, essentially sulfur free gas, at atmospheric or higher pressure will be passed to contact the fuel electrode of a fuel cell, preferably an axially elongated, solid oxide electrolyte fuel cell. This desulfurization process allows the sulfur sorbent medium to run 20 times as long before the adsorbent bed becomes exhausted.

BRIEF DESCRIPTION OF THE DRAWINGS

The above and other advantages of this invention will be more apparent from the following description in view of the drawings, where: the drawing FIGURE, is a schematic flow diagram of one embodiment of the method of this invention.

DETAILED DESCRIPTION OF THE PREFERRED EMBODIMENTS

Referring now to the drawing FIGURE, which schematically illustrates operating a fuel cell system comprising oxidant and fuel sources, pumping apparatus, heating apparatus, desulfurization apparatus, reforming apparatus, fuel cell generator apparatus, and the like. Main feed stream 10 contains a sulfur containing fuel gas with at least 0.30 ppm, usually 0.50 ppm to 25 ppm, of odorous sulfur compounds. In some instances, if natural gas, this steam can contain as high as 30 vol. % odorous sulfur compounds. While $H_2S$ can be present in major amounts and is only mildly odorous, it is still considered an odorous material. Sulfur containing stenches, such as tertiary butyl mercaptan [$(CH_3)_3CSH$], dimethyl sulfide [$CH_3SCH_3$] and tetrahydrothiophene [$C_4HBS$] are added to natural gas by commercial natural gas utilities. These stenches are added to permit detection in the event of a leak. The stenches named are not the only ones present in natural gas, but are the most commonly used ones. This invention applies to any sulfur containing compound that may be present in a gas feed for an SOFC generator. Additional possible sulfur compounds are discussed later when describing the sulfur selective membrane. As mentioned previously, evaporated sulfur and hydrogen containing diesel fuel, or coal gas fuel can also be used as the main fuel feed stream 10. A portion of the main fuel feed stream is passed via stream 12 to a pump, compressor or the like 14 to compress the fuel feed to a pressure effective to operate the sulfur selective membrane 16, usually over 304 kPa (kilo Pascals; 44 psi or 3 atmospheres), preferably from 304 kPa to 20670 kPa (44 psi to 3000 psi).

The membrane separation apparatus may contain any type of porous membrane which will selectively separate sulfur compounds from hydrocarbon compounds, such as methane, ethane, propane, butane, and the like, either by allowing the sulfur compounds through its pores while not allowing the carbon compounds through its pores or by allowing the carbon compounds through its pores while not allowing the sulfur compounds through its pores. A variety of membranes are useful. For example, membranes made of silicone capillary fibers, such as polydimethylsiloxane silicone copolymer fibers, as described in U.S. Pat. No. 3,534,528 (Porter), herein incorporated by reference. There, 30 vol. % $H_2S$ was separated from a natural gas stream containing 70 vol. % of methane at 2000 psi (13780 kPa), by passing through the walls of the membrane. This patent also provides a general description of a wide variety of other useful sulfur selective membranes, for example, $C_2$–$C_4$ polyolefins, such as $C_2$–$C_4$ polyethylene and polypropylene; polyamides such as nylon; acrylic resins; butyl rubbers; cellulose ethers; and cellulose esters. The membranes selected would depend on the content to be separated and its solubility in the membrane. Block copolymer membranes useful to separate $SO_2$, $H_2S$ and $SO_3$ were described in U.S. Pat. No. 3,653,180 (Juliano, et al.). This patent described sulfur selective membranes containing poly (oxyethylene) glycol carbonate segments in polycarbonate chains.

Cooley, et al., in U.S. Pat. No. 4,130,403, taught removing $H_2S$ and $CO_2$ from a natural gas stream, containing hydrocarbons with up to 8 carbon atoms, utilizing dried cellulose ester membranes. The separation was due to molecular interaction between the various gaseous components of the feed stream and the membrane, where, because different components react differently with the membrane, the transmission rates (permeation fluxes) were different for each component. Other patents in the sulfur selective membrane technology area include U.S. Pat. No. 4,608,060, relating to multicomponent membranes such as polyethyleneglycol and silicon rubber composited on polysulfone, U.S. Pat. No. 5,487,774 relating to ceramic membranes fabricated from metal sols and having mean pore diameters between 5 Angstrom Units to 20 Angstrom Units (Kulprathipanja, et al., and Peterson, et al., respectively).

Passage into the sulfur selective membrane apparatus 16 provides a sulfur concentrated stream 18, and a sulfur lean stream 20, where stream 20 contains no more than 0.20 ppm of sulfur compounds. The sulfur concentrated stream 18 is then passed back to the main feed stream 10 at a point 22 downstream from point 24 where the portion 12 was provided for the method of this invention, so that the main feed stream 10 is enriched with odorous sulfur compounds, enhancing gas leak detection. This is also a convenient and efficient way to dispose of the odorous sulfur compounds in stream 18.

At this point, it is useful to meter the flow volume of the sulfur lean stream 20 in optional gas meter 26. At this point, if the pressure of the lean stream 20 is so high that it could harm the sulfur sorbent medium 28 in sulfur sorbent desulfurizer 30, then a pressure reducing device (not shown) can be instilled in stream 20 or stream 32. The optionally metered/depressurized sulfur lean stream 32 then passes through the sulfur sorbent medium 28, to collect sulfur, providing an essentially sulfur free stream 34 containing no more than 0.10 ppm of sulfur compounds. Preferably, stream 34 contains between 0.025 ppm to 0.075 ppm of sulfur compounds that are passed to SOFC unit 36, and sulfur poisoning of the fuel cells is completely prevented, eliminating the need of any sulfur tolerant coating on the SOFC 38 exterior electrode. One type of sulfur sorbent medium 28 is described in the previously discussed Singh, et al., U.S. Pat. No. 5,686,196, where a Co—Mo catalyst on a ZnO reactive bed is used. A ZnO bed could also be used itself, since $H_2S$, for example, would react with $Z_nO$ to form solid $Z_nS$ plus water. The ZnS could be discarded or regenerated by removing the sulfur. Other sulfur sorbents useful in this invention as the media 28 include, for example: activated carbon, activated carbon impregnated with copper oxide and commercially available proprietary mixtures of CuO and ZnO with a promoter, solid iron sponge, and the like. Liquid sorbent solutions can also be used, but are not preferred here. Such solutions could include monoethanol amine, and diethanol amine aqueous solutions, which react with $H_2S$ and can be regenerated for further use by heating, as taught in U.S. Pat. No. 5,407,466 (Lokhandwala, et al.).

The essentially sulfur free stream 34 can then be further processed by heating, pressurizing, depressurizing and the like and then passed to one or more external or internal reforming beds or impregnated silica boards 40 before contact as a fuel with the SOFC 38 along with an oxidant stream 42. Exhaust from the SOFC unit is shown as 44. Reforming media are discussed in detail in the Singh, et al., U.S. Pat. No. 5,527,631, are well known in the art, and can include for example Ni and or MgO alumina support structures within the SOFC's, silica pellets impregnated with Ni and/or Mgo as a catalyst bed, and the like. The components and operation of the SOFC 38 and SOFC unit 36 are well known and described in detail in the Domeracki U.S. Pat. No. 5,413,879. Typically, the solid oxide fuel cells comprise a porous air electrode, a gas-tight electrolyte and a fuel electrode. The air electrode may be made of strontium-doped lanthanum manganite. The electrolyte may be made from yttria-stabilized zirconia and covers the entire active length of the air electrode except for a thin strip. This thin strip of the air electrode is covered by a gas tight layer of magnesium-doped lanthanum chromite that forms the cell interconnection. The fuel electrode may be made from nickel-zirconia cermet and covers the electrolyte except in the interconnection area. The solid oxide fuel cells are arranged in an array so that each is electrically connected to the adjacent fuel cells.

An example follows of how the method of this invention would be operated for a process requiring 100 lb m/hr of natural gas (90 vol. % methane) at 310 kPa (45 psi) containing 4 ppm $H_2S$ and 2 ppm tertiary butyl mercaptan added as a highly odorous stench gas, where the system also uses an activated carbon sulfur absorbent. When this invention is used, 110 lbm/hr of natural gas would be taken from the gas main pipe and 10 lbm/hr would be returned to the gas main. The user of natural gas still pays for the same amount of natural gas, 100 lbm/hr. The sulfur selective membrane would remove 95% of the sulfur bearing molecules. The natural gas sent to the SOFC contain a much lower concentration of sulfur bearing odorants. For this example, the concentration would be reduced to 0.025 ppm.

The desulfurization process would run 20 times as long before the adsorbent bed would become exhausted. A monthly adsorbent replacement effort now becomes an action that occurs once every year and half and since sulfur concentration is below 0.10 ppm no modification of the SOFC fuel electrode would be required.

The present invention may be embodied in other forms without departing from the spirit or essential attributes thereof, and accordingly, reference should be made to both the appended claims, and to the foregoing specification as indicting the scope of the invention.

What is claimed is:

1. A process to desulfurize sulfur containing fuel gas used as feed fuel for fuel cell system comprising the steps:
   (1) providing a main feed stream of sulfur containing fuel gas containing at least 0.30 ppm of odorous sulfur compounds; and then
   (2) passing part of that main feed stream of sulfur containing fuel gas and compressing it to a pressure over 304 kPa; and then
   (3) passing the compressed sulfur containing fuel gas to sulfur selective membrane, where the gas is separated into a sulfur concentrated stream, and a sulfur lean stream containing no more than 0.20 ppm of sulfur compounds; and then
   (4) passing the sulfur concentrated stream back to the main feed stream down stream from where the stream of step (2) was provided; and then
   (5) optionally measuring gas flow and reducing gas pressure; and then
   (6) passing the sulfur lean stream through a sulfur sorbent medium to collect sulfur, providing an essentially sulfur free stream containing no more than 0.10 ppm of sulfur compounds; and
   (7) optionally reforming the essentially sulfur free stream prior to passing it to contact a fuel cell.

2. The method of claim 1, where the main feed stream is natural gas stream.

3. The method of claim 1, where the main feed stream contains odorous sulfur compounds selected from the group consisting of mercaptans, sulfides, and thiophenes and mixtures thereof.

4. The method of claim 1, where the main feed stream is a natural gas stream containing odorous sulfur compounds selected from the group consisting of tertiary butyl mercaptan, dimethyl sulfide, tetrahydrothiophene and mixtures thereof.

5. The method of claim 1, where the sulfur free stream is reformed in step (7).

6. The method of claim 1, where the fuel cell is an axially elongated solid oxide fuel cell.

7. The method of claim 1, where the fuel cell is contacted with a pressurized, essentially sulfur free stream in step (7).

8. The method of claim 1, where gas flow is measured between steps (4) and (6).

9. The method of claim 1, where the sulfur containing fuel gas passed to the sulfur selective membrane is at a pressure between 304 kPa and 20670 kPa.

10. The method of claim 1, where the essentially sulfur free stream provided in step (6) contains between about 0.025 ppm and 0.075 ppm of sulfur compounds.

11. A method of reducing the sulfur concentration in a sulfur containing fuel gas used as feed fuel for a fuel cell system, comprising:
   providing a main fuel feed stream containing a sulfur containing fuel gas;
   pressurizing at least a portion of the sulfur containing fuel gas;
   passing at least a portion of the pressurized sulfur containing fuel gas through a sulfur selective membrane to separate the gas into a sulfur concentrated stream and a sulfur lean stream, the sulfur concentrated stream having a higher sulfur concentration than the sulfur lean stream;
   passing the sulfur concentrated stream back into the main fuel feed stream downstream from where the sulfur containing fuel gas is pressurized; and
   passing the sulfur lean stream through a sulfur sorbent medium to reduce the sulfur concentration in the sulfur lean stream.

12. The method of claim 11, wherein the sulfur containing fuel gas contains at least 0.30 ppm of odorous sulfur compounds.

13. The method of claim 11, wherein the sulfur containing fuel gas is pressurized to a pressure greater than 304 kpa.

14. The method of claim 11, wherein the sulfur lean stream contains no more than 0.20 ppm of sulfur compounds.

15. The method of claim 11, wherein a gas flow is measured and a gas pressure is adjusted based upon the gas flow measurement.

16. The method of claim 15, wherein the gas flow is measured prior to passing the sulfur lean stream through the sulfur sorbent medium.

17. The method of claim 11, wherein the sulfur sorbent medium reduces the sulfur concentration in the sulfur lean stream to no more than 0.10 ppm of sulfur compounds.

18. The method of claim 11, wherein the sulfur lean stream is reformed prior to contacting a fuel cell.

19. A method of reducing the sulfur concentration in a sulfur containing fuel gas used as feed fuel for a fuel cell system, comprising:
   providing a main fuel feed stream containing a sulfur containing fuel gas;
   passing at least a portion of the sulfur containing fuel gas through a sulfur selective membrane to separate the gas into a sulfur concentrated stream and a sulfur lean stream, the sulfur concentrated stream having a higher sulfur concentration than the sulfur lean stream;
   passing the sulfur concentrated stream back into the main fuel feed stream such that the sulfur concentrated stream does not mix with the sulfur lean stream; and
   passing the sulfur lean stream through a sulfur sorbent medium to reduce the sulfur concentration in the sulfur lean stream for use as the feed fuel for the fuel cell system.

20. The method of claim 19, wherein at least a portion of the sulfur containing fuel gas is pressurized to over 304 kpa prior to passing the sulfur containing fuel gas through the sulfur selective membrane.

* * * * *